(12) United States Patent
Dunn et al.

(10) Patent No.: US 7,030,315 B1
(45) Date of Patent: Apr. 18, 2006

(54) FIELD REPLACEABLE RETAINER

(75) Inventors: John P. Dunn, Knoxville, TN (US); Bobby C. Kent, Jr., Loudon, TN (US)

(73) Assignee: United States Utility Enclosures L.L.C., Sweetwater, TN (US)

( * ) Notice: Subject to any disclaimer, the term of this patent is extended or adjusted under 35 U.S.C. 154(b) by 0 days.

(21) Appl. No.: 11/165,879

(22) Filed: Jun. 24, 2005

Related U.S. Application Data (60) Provisional application No. 60/583,942, filed on Jun. 29, 2004.

(51) Int. Cl.
*H02G 9/00* (2006.01)

(52) U.S. Cl. ............................. 174/37; 174/50; 174/66; 174/67; 174/38; 174/39; 174/17 R; 361/601; 361/93; 361/118; 439/474; 439/923

(58) Field of Classification Search .................. 174/50, 174/37, 38, 39, 66, 67, 17 R; 361/601, 93; 439/474, 923
See application file for complete search history.

(56) References Cited

U.S. PATENT DOCUMENTS

| | | | | |
|---|---|---|---|---|
| 3,760,234 A | * | 9/1973 | Jones et al. | 361/666 |
| 3,972,440 A | * | 8/1976 | Warren | 220/484 |
| 5,335,160 A | * | 8/1994 | Savoca | 362/431 |
| 5,823,577 A | * | 10/1998 | Johnston | 285/30 |
| 6,164,131 A | * | 12/2000 | Edwards et al. | 73/277 |

* cited by examiner

*Primary Examiner*—Dean A. Reichard
*Assistant Examiner*—Anton Harris
(74) *Attorney, Agent, or Firm*—Luedeka, Neely & Graham, P.C.

(57) ABSTRACT

A utility box having a housing and a ring affixed on an upper circumferential rim of the housing. The ring forms a through hole with a bore that receives an attachment means from the cover. Tabs at a lower portion partially form a retaining recess that is disposed between the tabs and the bore. The tabs receive a fastener there through. The retaining recess receives a flexible washer, which deforms to pass through the tabs. The tabs retain the washer within the retaining recess against a first downward force, and allow the washer to be ejected upon application of a greater force. A fastener cavity is disposed between the bore and the retaining recess. The fastener cavity receives the fastener. The fastener is retained when the washer is within the retaining recess, and is loosed when the washer is removed.

20 Claims, 8 Drawing Sheets

FIELD REPLACEABLE RETAINER

This invention claims priority based on provisional application Ser. No. 60/583,942, filed 2004.06.29. This invention relates to the field of underground utility boxes. More particularly, this invention relates to field replaceable cover fasteners for underground utility boxes.

FIELD

Background

Underground utility boxes are used to provide access to a variety of different underground systems, such as electric, gas, water, telephone, data, and so forth. For example, a utility box can provide access to a valve, meter, or utility junction that is disposed under the ground. These boxes are typically comprised of a housing that fits over the portion of the system to which access is desired. The housing fits down into the ground, and is designed to be substantially completely buried, with the top of the housing disposed at about ground level. The housing is constructed in such a manner that it is difficult to remove the housing, without removing the earth around the box.

Utility boxes of this type typically have a cover that protects the system that is exposed within the box from unauthorized access or consequential damage. The cover is usually fastened to the box with one or more bolts that pass through the cover and are retained by some type of connection to the housing. Because the utility box cannot be conveniently accessed from below, the connection needs to be retained in some manner in the housing, so that the bolt can thread to it.

To accomplish this, underground utility box manufacturers fabricate their boxes with nuts that are affixed in some manner to the housing against which the cover is fastened. The nuts can be glued to the housing with an adhesive, or can be molded directly into the material of which the housing is formed. In this manner, the cover can be placed on the housing, and the bolt can be inserted through the holes in the cover and threaded into the nut that is affixed to the housing.

Unfortunately, the nuts tend to work loose from the housing over time. This can happen just through normal use over an extended period of time, or it can happen immediately if the bolt is tightened onto the nut with too great a force. Another problem with this configuration is when the nut becomes damaged in some manner. For example, if the bolt is not inserted correctly into the nut, the nut can be cross threaded. When problems such as any of these occur, there is no easy way to replace the nut in the housing, and in many cases the housing has to be damaged in order to remove and replace the nut.

In an effort to provide a field replaceable nut, some manufacturers have introduced additional flaws to their products. Some methods sufficiently weaken or damage the ring such that normal fastening and usage forces will cause breakage or failure of the product. This generally occurs when a cover is unevenly applied to the housing, due to warping or trapped debris. This can result in a gap above one or more of the nuts mounted in the housing. When the fastener is inserted and tightened the upward force on the nut stresses the housing and exposes the flaws that have been introduced by the manufacturing process.

In other cases, the nut is inserted into the ring with no means of drainage beneath the nut. Since the product is typically used outside and exposed to the elements, water inevitably enters the fastener and settles in the area of the nut. Two problems can result from this scenario. First, the fastener and nut are subjected to the corrosive effects of the trapped water, and second, when the product is exposed to freezing temperatures, the water expands and cracks the ring.

What is needed, therefore, is a system that overcomes problems such as those described above, at least in part.

SUMMARY

The above and other needs are met by a utility box having a housing and a ring affixed on an upper circumferential rim of the housing. The ring is adapted to receive a cover. The ring forms a through hole extending straight through from an upper surface of the ring to a lower surface of the ring. The through hole has a bore with a first diameter at an upper portion of the through hole near the upper surface of the ring. The bore is adapted to receive an attachment means depending from the cover. Tabs at a lower portion of the through hole near the lower surface of the ring partially form a retaining recess having a second diameter that is disposed between the tabs and the bore. The tabs extend partially into the second diameter and form a third diameter. The tabs are adapted to receive a fastener there through, where the fastener has a fourth diameter.

The retaining recess is adapted to receive a flexible washer having a fifth diameter, which deforms to pass through the tabs to return to its fifth diameter within the retaining recess. The tabs are adapted to retain the flexible washer within the retaining recess against a first downward force, and to allow the flexible washer to be ejected from the retaining recess through the tabs upon application of a second downward force that is greater than the first downward force. A fastener cavity is disposed within the through hole between the bore and the retaining recess. The fastener cavity has a sixth diameter and is adapted to receive the fastener, which mates with and secures the attachment means depending from the cover.

The fastener is retained within the fastener cavity when the flexible washer is disposed within the retaining recess, and the fastener is loosed from the fastener cavity when the flexible washer is removed from the retaining recess. The fastener cavity is adapted to prohibit complete rotation of the fastener around an axis that is substantially parallel to the through hole when the fastener is disposed within the fastener cavity. The fourth diameter is greater than the first diameter, the sixth diameter is greater than the fourth diameter, the fifth diameter is greater than the fourth diameter, the second diameter is greater than the fifth diameter, and the third diameter is less than the fifth diameter.

In this manner, the embodiment of the invention described above provides a field replaceable retainer for the cover of an underground utility box. The retainer can be removed and replaced without any special tools. Further, this and other embodiments allow water to drain out the bottom of the through hole in which the retaining elements are disposed, so that the retaining elements are not subjected to a submerged environment, and thus do not corrode as quickly as they otherwise might. Furthermore, proper drainage prevents the damage caused by trapped water that might expand when exposed to freezing temperatures and cause damage to the product.

In various embodiments, the ring is molded onto the housing. The housing is preferably open at an end disposed opposite from the ring. Preferably, the box includes a cover with a bore that is adapted to receive and retain the attachment means to the cover when the attachment means are drawn in a downward direction toward the ring, and for presenting the attachment means into the through hole in the ring. The ring is preferably cast onto the housing and is formed of polymer concrete. The housing is preferably formed of fiberglass. Preferably, the ring includes at least two of the through holes. In one embodiment the attachment means is a bolt and the fastener is a nut. The fastener cavity preferably substantially prohibits any rotation of the fastener when the fastener is disposed within the fastener cavity.

According to another aspect of the invention there is described a utility box having a housing and a ring on an upper circumferential rim of the housing. The ring is adapted to receive a cover, and forms a through hole from an upper surface of the ring. The through hole has a bore with a first width at an upper portion of the through hole near the upper surface of the ring. The bore is adapted to receive an attachment means depending from the cover. A fastener cavity is disposed within the through hole below the bore. The fastener cavity has a second width that is greater than the first width, and is adapted to receive a fastener that mates with and secures an attachment means depending from the cover. The fastener cavity is adapted to prohibit complete rotation of the fastener around an axis that is substantially parallel to the through hole when the fastener is disposed within the fastener cavity. The fastener cavity is open to an inside of the housing and ring. A retaining recess is disposed below the fastener cavity, and is adapted to receive a washer, where the washer is positioned to hold the fastener on a bottom of the fastener cavity. The retaining recess is also open to the inside of the housing and ring.

According to yet another aspect of the invention there is described a utility box having a housing and a ring affixed on an upper circumferential rim of the housing. The ring is adapted to receive a cover, and forms an aperture extending straight through from an upper surface of the ring to a lower surface of the ring. An insert is fit into the aperture of the ring, and is formed of a different material from that of the ring. The insert forms a through hole.

A bore with a first diameter is disposed at an upper portion of the through hole. The bore is adapted to receive an attachment means depending from the cover. Tabs are disposed at a lower portion of the through hole, and partially form a retaining recess having a second diameter that is disposed between the tabs and the bore. The tabs extend partially into the second diameter and form a third diameter. The tabs are adapted to receive a fastener there through, where the fastener has a fourth diameter.

The retaining recess is adapted to receive a flexible washer having a fifth diameter, which deforms to pass through the tabs to return to its fifth diameter within the retaining recess. The tabs are adapted to retain the flexible washer within the retaining recess against a first downward force, and to allow the flexible washer to be ejected from the retaining recess through the tabs upon application of a second downward force that is greater than the first downward force.

A fastener cavity is disposed within the through hole between the bore and the retaining recess. The fastener cavity has a sixth diameter, and is adapted to receive the fastener, which mates with and secures the attachment means depending from the cover. The fastener is retained within the fastener cavity when the flexible washer is disposed within the retaining recess, and the fastener is loosed from the fastener cavity when the flexible washer is removed from the retaining recess.

The fastener cavity is adapted to prohibit complete rotation of the fastener around an axis that is substantially parallel to the through hole when the fastener is disposed within the fastener cavity. The fourth diameter is greater than the first diameter, the sixth diameter is greater than the fourth diameter, the fifth diameter is greater than the fourth diameter, the second diameter is greater than the fifth diameter, and the third diameter is less than the fifth diameter.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
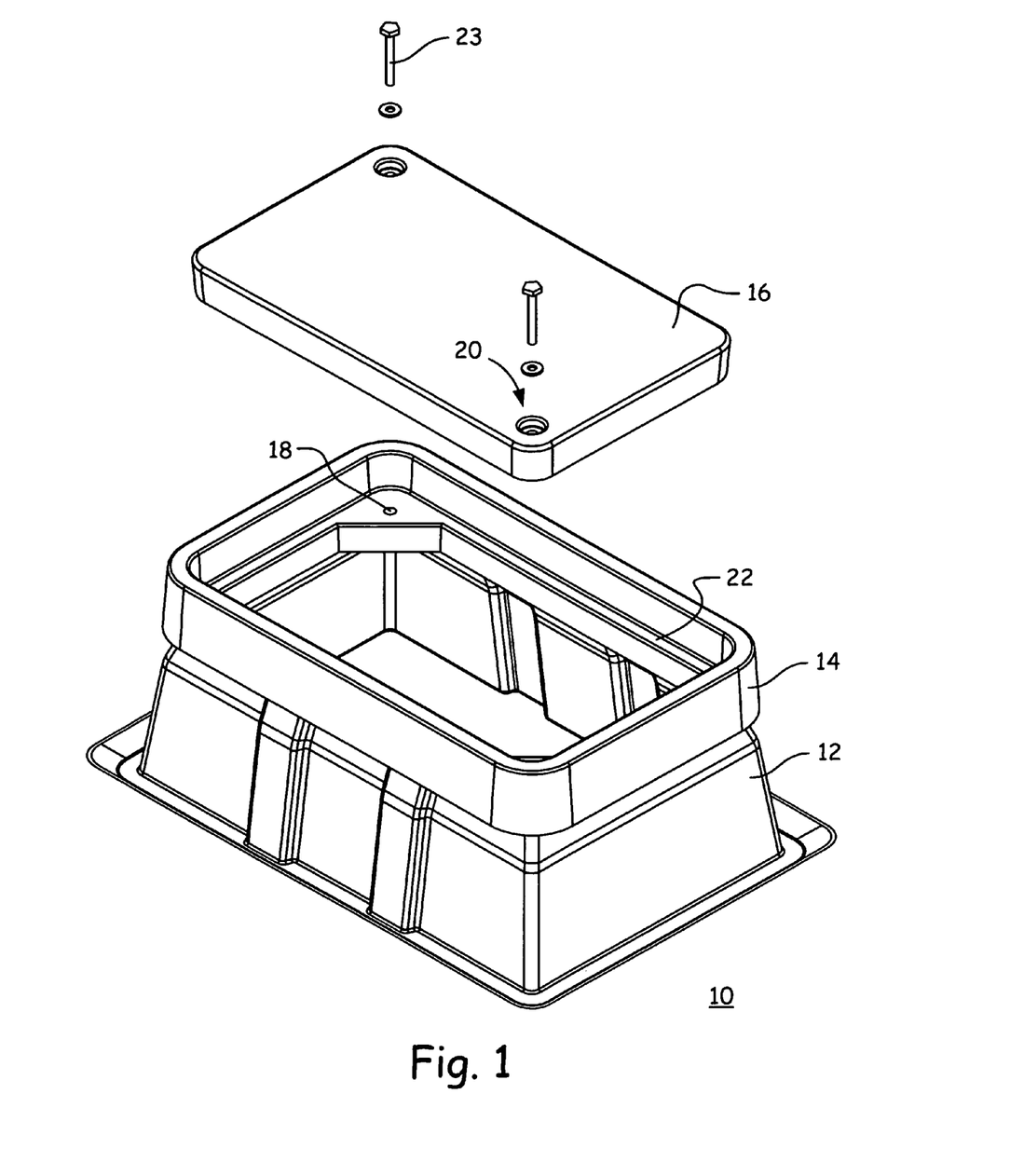
FIG. 1 is a perspective view of an underground utility box.
Figure 2:
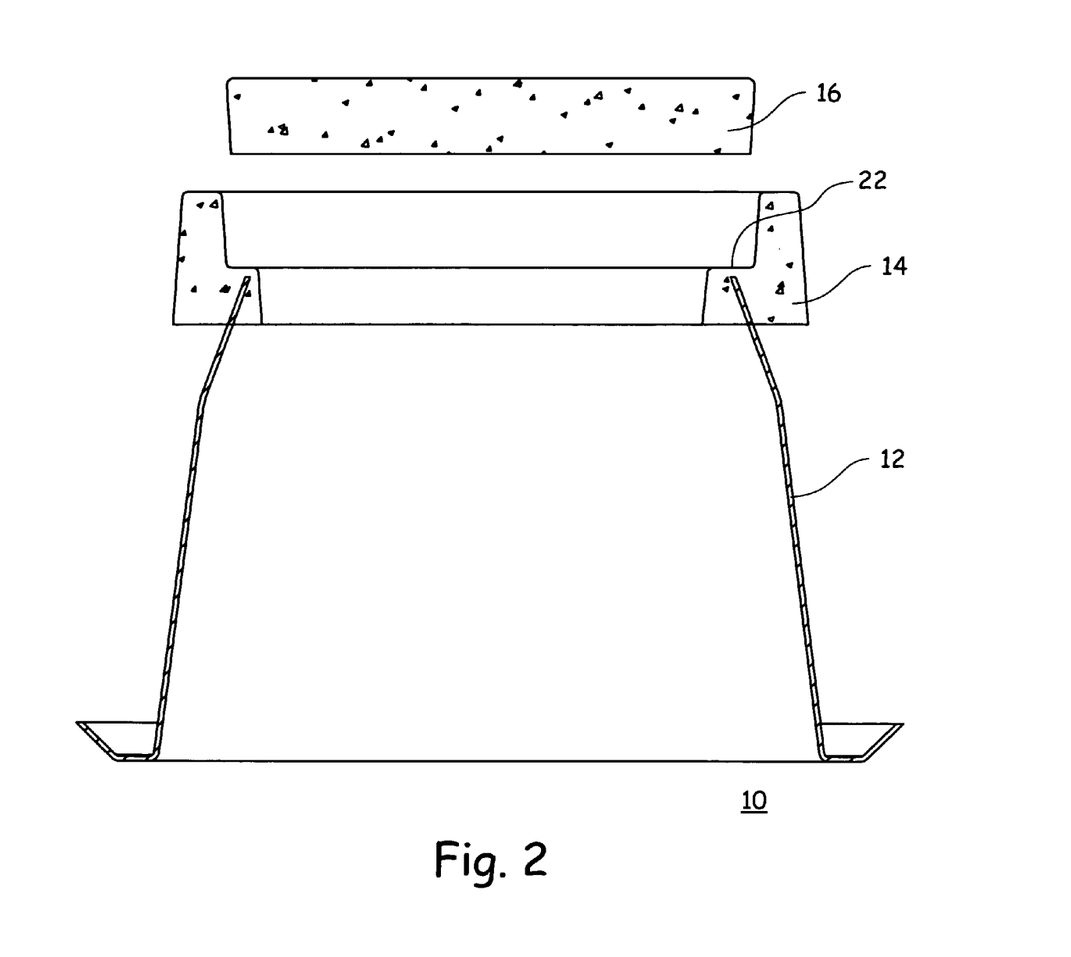
FIG. 2 is a cross sectional view of an underground utility box.

With reference now to FIGS. 1 and 2, there is provided a perspective depiction and a cross sectional depiction respectively of an underground utility box 10 according to a preferred embodiment of the present invention. The utility box 10 is designed to be buried in the ground with an upper surface of the box 10 disposed substantially at ground level. The box 10 includes a housing 12 that encompasses the system to be housed within the box 10. The housing 12 is preferably formed of a material that provides a desired degree of structural support and which will not readily decay or become otherwise damaged in an underground environment. The environment may be wet or dry dirt, clay, asphalt, gravel, sand, or some other type of filling material or mixture of such. Fiberglass tends to work well for the construction of the housing 12.

The sides of the housing 12 may be ribbed to provide additional structural support, or may have other elements that provide structural support. The bottom of the housing 12 is preferably open, so as to enable the box 10 to be placed over the system to be protected within the box 10. The sidewalls of the housing 12 may slope from a smaller circumferential perimeter at the top of the box 10 to a larger circumferential perimeter at the bottom the box 10. This slope tends to reduce the size of the upper opening in the box 10, increase the difficulty of removing the box 10 after it has been buried, and increase the structural strength of the box 10, all of which are desired attributes of the box 10. The lower circumferential edge of the housing 12 preferably has an upward curving lip to further increase the difficulty of removing the box 10 after it has been buried.

A ring 14 is disposed around an upper circumferential edge of the housing 12. Within the ring 14 are one or more, and preferably two, through holes 18 that include field replaceable retainers, as described in more detail below. The ring 14 is preferably formed of a polymer concrete that is cast onto the housing 12. In other embodiments the ring 14 is formed of the same material as the housing 12, and is molded onto the housing 12. In yet another embodiment the ring 14 is formed of the same material as the housing 12, and is formed in the same molding process by which the housing 12 is fabricated.

The ring 14 preferably has a lip 22 that is adapted to receive the cover 16. The lip 22 is sized so that the cover 16 aligns with the ring 14 in a manner as described in more detail below. The lip 22 is preferably also sized so as to allow relatively unrestrained access to the inside of the box 10 through the ring 14, while still having the ability to support the cover 16 in a manner that it does not fall too easily through the ring 14 and into the box 10 when the cover 16 is being placed on the ring 14. The cover 16 is preferably formed of the same material as the ring 14, but may alternately be formed of any material that is compatible with the materials, environments, and applications generally described herein.

The cover 16 includes a bore 20, and preferably includes at least two such bores 20, which are adapted to receive attachment means 23. The attachment means 23 are preferably bolts, but may be some other type of pin that is designed to engage with a fastener as described in more detail below. As introduced above, the ring 14 is preferably sized so that when the cover 16 is disposed on the lip 22, the bores 20 are substantially aligned with the through holes 18. Preferably, the top surface of the cover 16 is substantially coplanar with the top surface of the ring 14 when the cover 16 is in place on the lip 22 of the ring 14.

Figure 3:
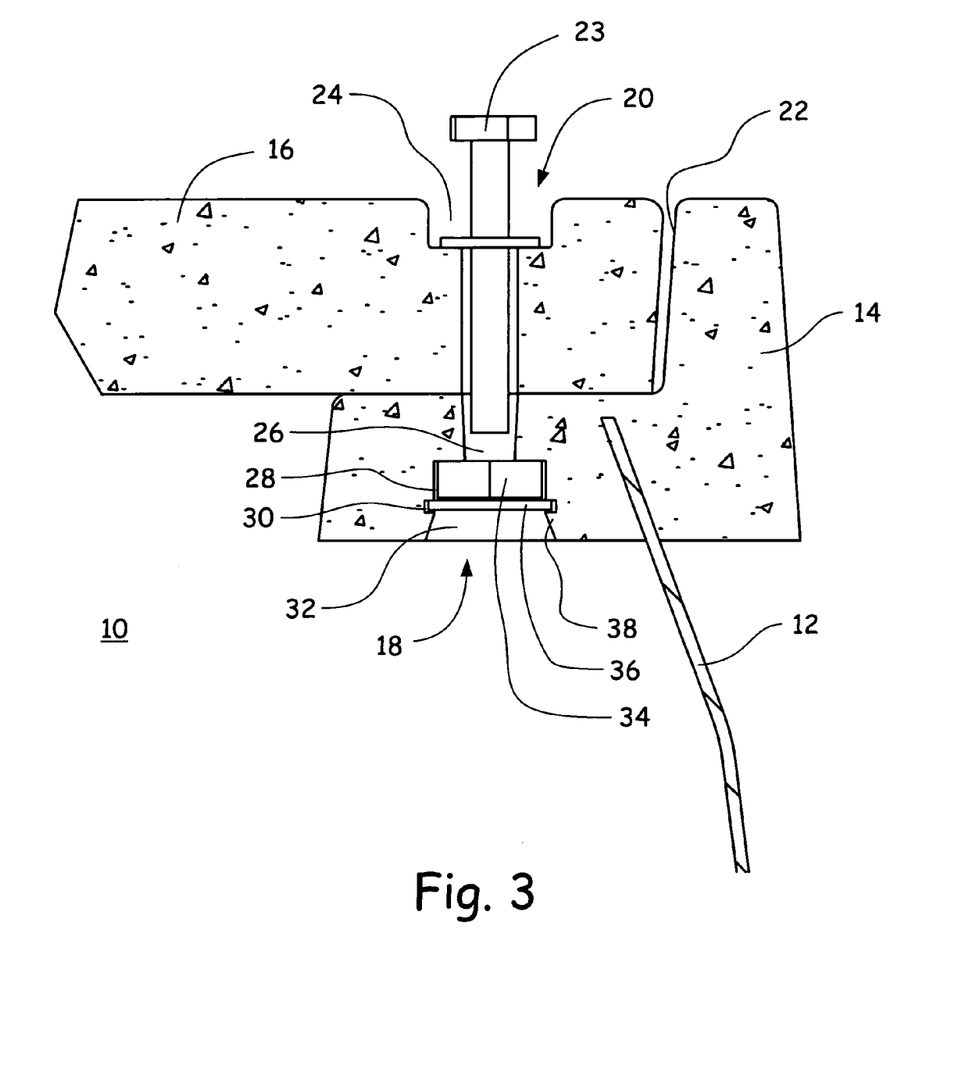
FIG. 3 is a detailed cross sectional view of a retaining mechanism for an underground utility box according to a first embodiment of the present invention.

With reference now to FIG. 3 there is depicted an enlarged cross sectional view of a portion of the box 10, which provides more detail in regard to the field replaceable retainer. FIG. 3 depicts a portion of the cover 16 residing in the lip 22 of the ring 14, and a portion of the housing 12. As depicted in FIG. 3, an attachment means 23, preferably a bolt, fits down through the through hole 20 in the cover 16, and extends below the bottom surface of the cover 16. The attachment means 23 is retained against the top surface of the cover 16, such as by a head on the end of the attachment means 23 that fits within a recess 24 of the bore 20 in the cover 16. A washer is optionally used in the recess 24, as desired. Preferably the attachment means 23 does not extend above the top surface of the cover 16 when in use.

The attachment means 23 is received by the through hole 18 in the ring 14. The through hole 18 preferably extends completely through the ring 14 from an upper surface of the ring 14 to a lower surface of the ring 14. The through hole 18 preferably has four different sections. The first section 26 is disposed near the upper surface of the ring 14, and is a bore that is adapted to receive the attachment means 23. The second section 28 is a fastener cavity that is adapted to receive a fastener 34. The third section 30 is a retaining recess that is adapted to receive a flexible washer 36. The fourth section 32 includes tabs 38 that are disposed nearer to the lower surface of the ring 14 than the other sections, and which partially form the retaining recess 30. Each of these sections is described in more detail below.

The bore 26 of the first section preferably has a diameter that is sufficient to receive the attachment means 23 that depends from the cover 16. The bottom of the bore 26 may be slightly tapered so as to center the attachment means 23 into the fastener 34 that is disposed in the second section 28 of the through hole 18. The fastener cavity 28 of the second section has a diameter that is large enough to hold the fastener 34, which diameter is larger than that of the bore 26, so that the fastener 34 is retained within the fastener cavity 28 and cannot be pulled up through the bore 26. Preferably, the fastener cavity 28 is sized such that the fastener 34 cannot rotate in a complete revolution within the fastener cavity 28. Most preferably, the fastener 34 can only rotate, at most, a few degrees. In an especially preferred embodiment, the faster 34 is initially cast within the fastener cavity 28, and cannot rotate in any substantial manner.

The retaining recess 30 of the third section preferably has a diameter that is greater than that of the fastener cavity 28. The retaining recess 30 is designed to receive a flexible washer 36 that is held within the retaining recess 30 in a manner as described in more detail below. When the flexible washer 36 is retained within the retaining recess 30, the fastener 34 is retained within the fastener cavity 28. When the flexible washer 36 is removed from the retaining recess 30, the fastener 34 can also be removed from the fastener cavity 28.

Figure 4:
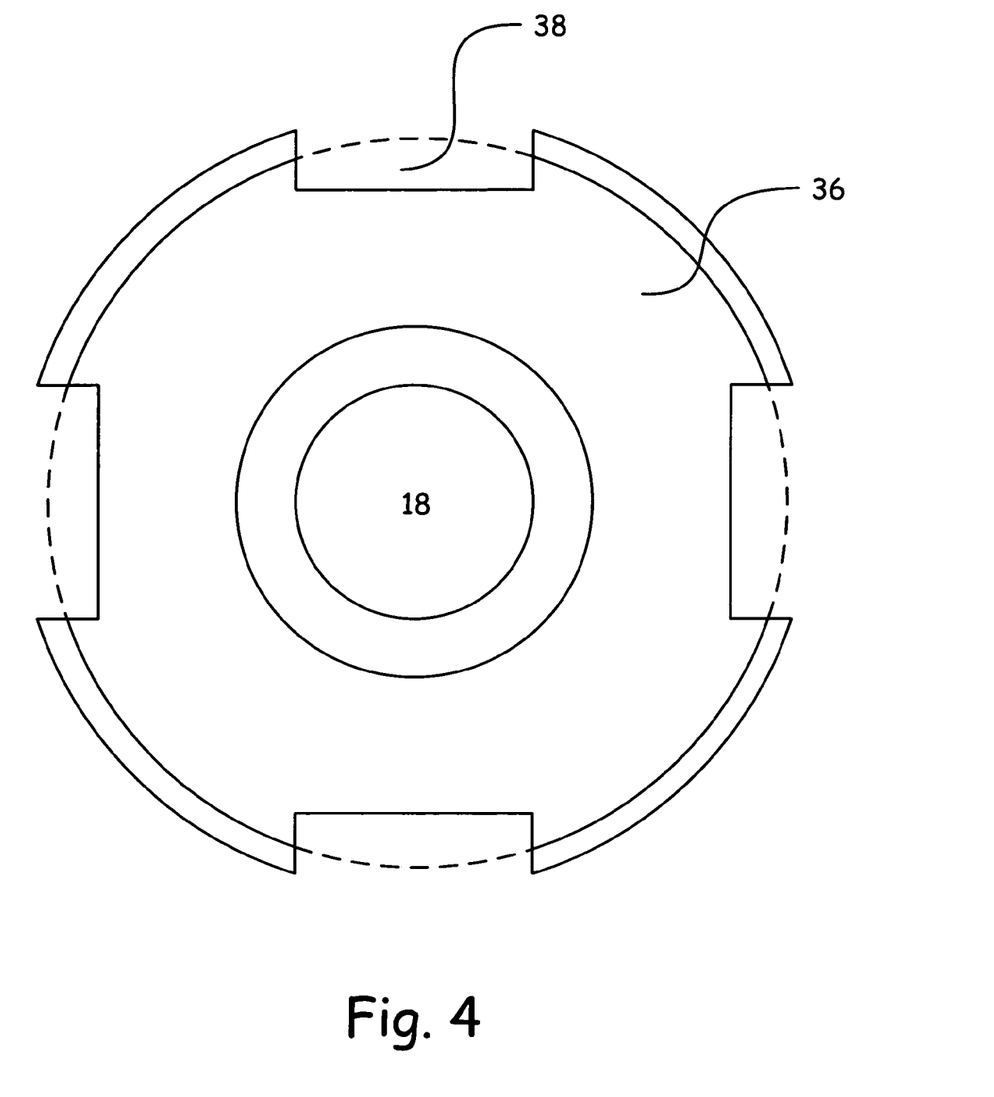
FIG. 4 is a bottom view of the tabs of the retaining mechanism for an underground utility box according to a first embodiment of the present invention.

With reference now to FIG. 4, there is depicted a view of the through hole 18 from the bottom. Visible in greater detail in FIG. 4 are the tabs 38 of the fourth section 32 of the through hole 18, which are formed such that they form the bottom of the retaining recess 30. The tabs 38 extend inward into the through hole 18, narrowing the diameter of the through hole 18 within the fourth section 32. However, the tabs 38 narrow the diameter only to the extent needed to retain the flexible washer 36 within the retaining recess 30. The tabs 38 form a diameter that is large enough so that the flexible washer 36 can deform enough to pass through the diameter formed by the tabs 38, and then relax into its natural size and be retained within the retaining recess 30.

The flexible washer 36 is preferably able to withstand forces up to a given force and still be retained within the retaining recess 30. For example, the flexible washer 36 is preferably able to withstand the normal forces of inserting the attachment means 23 into the fastener 34 without popping out of the retaining recess 36. However, the flexible washer 36 is preferably releasable from the retaining recess 30 upon exertion of a downward force that is greater than the given force. In this manner, by exerting the given force in a downward direction on the fastener 34, such as by striking the extending attachment means 23 with a hammer from above the cover 16, the fastener 34 and the flexible washer 36 are ejected from the through hole 18 as desired.

Figure 5A:
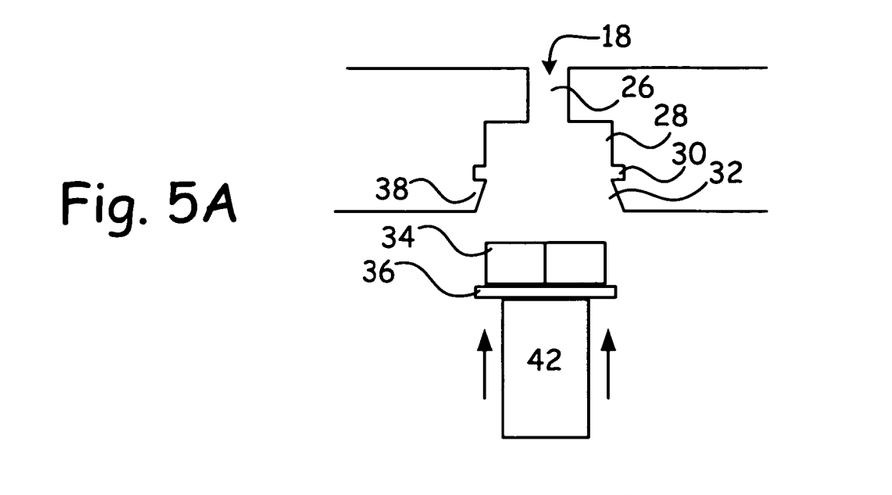
FIGS. 5A–5C are a series of views of a nut and flexible washer being inserted into an underground utility box according to a first embodiment of the present invention.
Figure 5B:
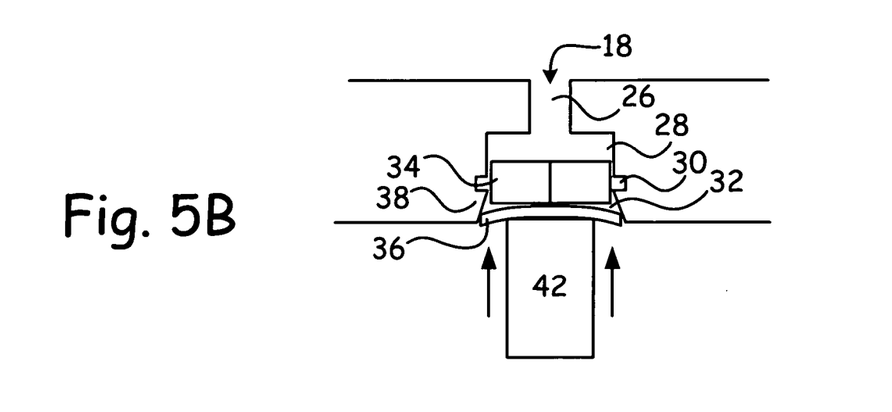
Figure 5C:
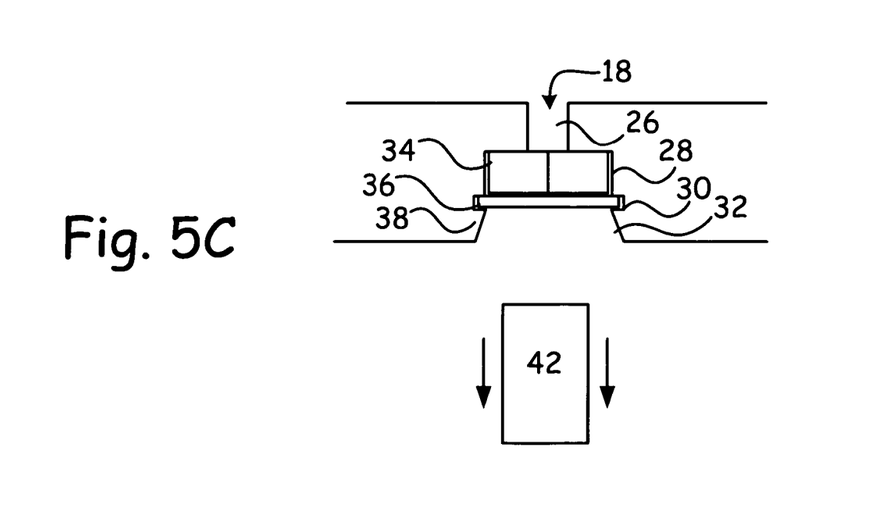

After the fastener 34 and the flexible washer 36 are ejected in this or by some other process, the fastener 34 can be replaced. This might be desirable when, for example, the fastener 34 has been damaged, such as by cross threading. Preferably, a new flexible washer 36 is used to retain the replaced fastener 34. FIGS. 5A through 5C depict a method of inserting a new fastener 34 and flexible washer 36 into the through hole 18 of the box 10.

As depicted in FIG. 5A, the flexible washer 36 and the nut 24 are preferably loaded onto an insertion tool 42, positioned under the through hole 18, and raised up from underneath the through hole 18 toward the through hole 18. The nut 34 is sized to fit up through the third and fourth sections 30 and 32 of the through hole 18, as described above, and into the second section 28, as depicted in FIG. 5B. The flexible washer 36 deforms as is passes the tabs 38 of the fourth section 32, but relaxes into its natural configuration when it passes into the third section 30, as depicted in FIG. 5C, where it is retained by the tabs 38. At this point the insertion tool 42 is removed. The insertion tool 42 is, in one embodiment, formed as part of a clamp that is used to provide the pressure to drive the insertion process. The clamp may be in the form of a pliers or a C-type clamp, or take any one or more of a number of other forms.

Figure 6:
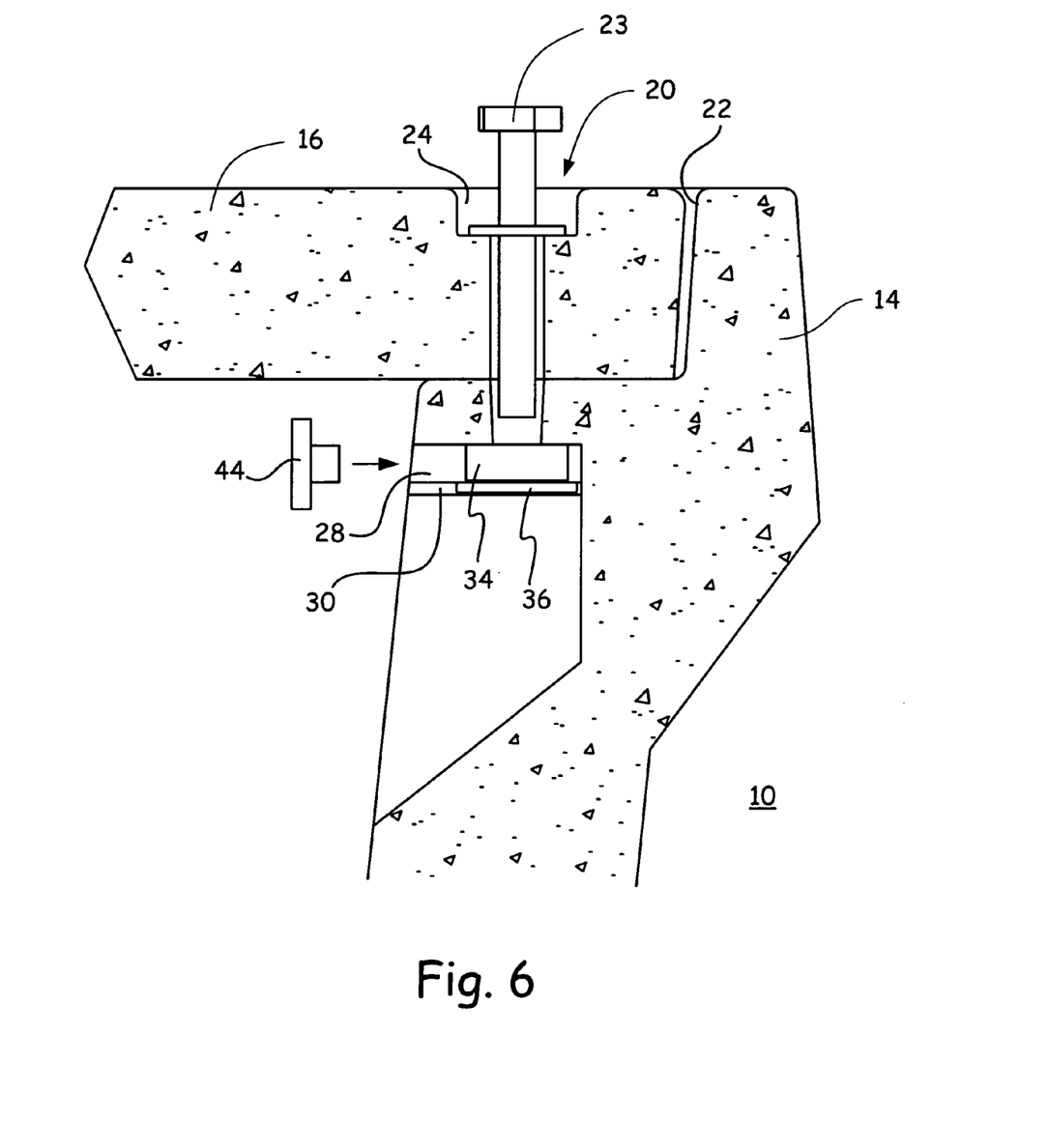
FIG. 6 is a detailed cross sectional view of a retaining mechanism for an underground utility box according to a second embodiment of the present invention.
Figure 7:
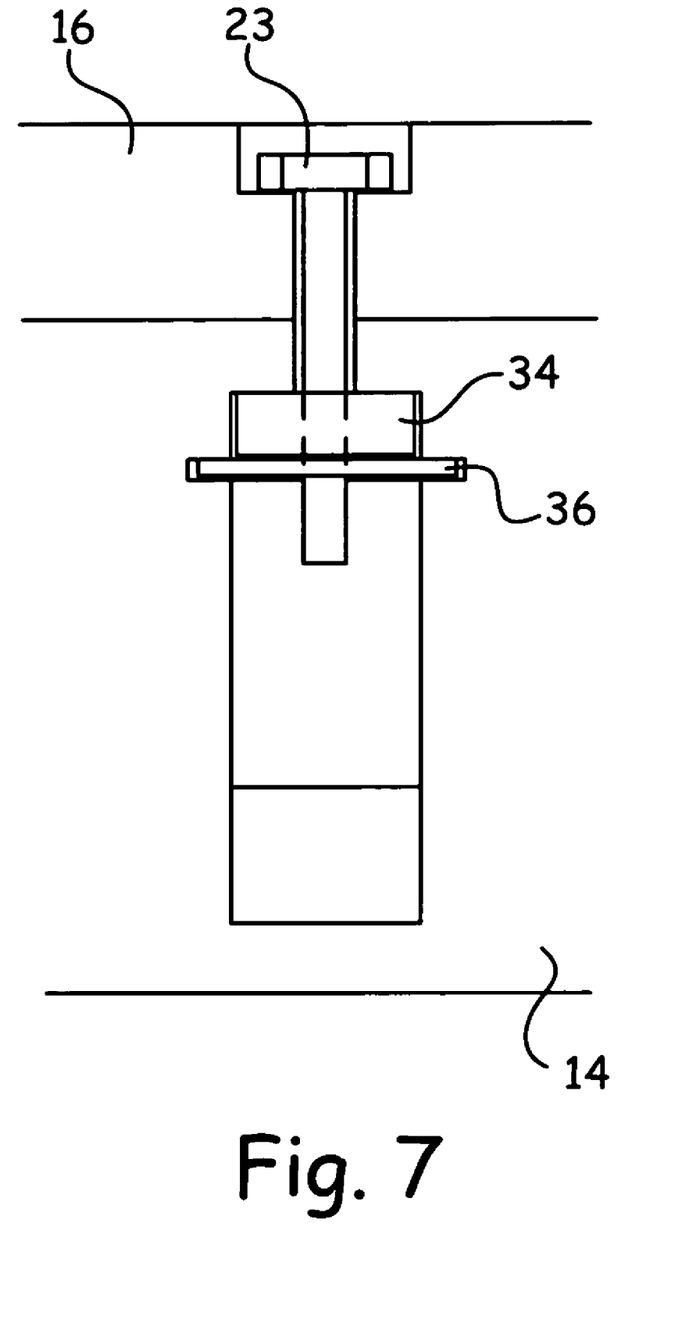
FIG. 7 is a side view of a retaining mechanism for an underground utility box according to a second embodiment of the present invention.

With reference now to FIG. 6 there is depicted a cross section of a second embodiment of the present invention. In this embodiment, the retaining recess 30 is accessible from a side of the ring 14, which has a slightly different configuration from that of the first embodiment. Thus, the washer 36, which need not be a flexible washer, is inserted from the side, and is preferably press fit into the retaining recess 30 so as to be retained in some degree by friction. The fastener 34 can be inserted into the fastener cavity 28, which is also open from the side, either before or after the washer 36 is in place. A cap 44 of some type preferably retains the fastener 34 within the fastener cavity 28. FIG. 7 is a side view of this second embodiment of the retaining mechanism.

Figure 8:
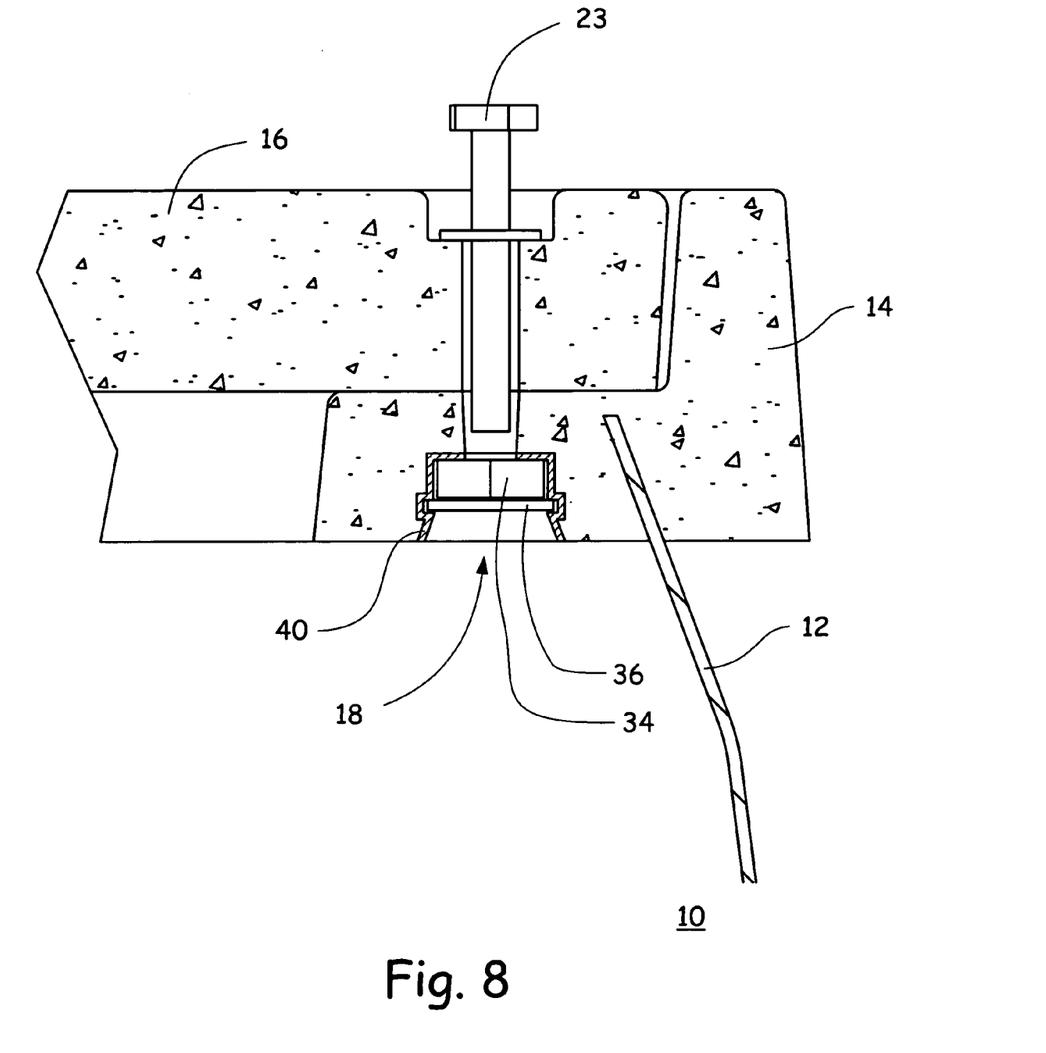
FIG. 8 is a detailed cross sectional view of a retaining mechanism for an underground utility box according to a third embodiment of the present invention.

With reference now to FIG. 8 there is depicted a detailed cross sectional view of a retaining mechanism for an underground utility box according to a third embodiment of the present invention. This third embodiment works in much the same manner as that described above in regard to the first embodiment, but at least some of the elements of the through hole 18 are formed by an insert 40 that is preferably cast into the ring 14 at the time that it is formed. The insert 40 is preferable formed of a material that is resilient to the materials, environments, and usages as described herein. At times, these criteria may be at odds with the criteria for the material of which the ring 14 is formed. For example, polymer concrete may be desired for the ring 14, but may not be the best material for the various elements of the through hole 18. Thus, the insert 40 is preferably formed of a thermoplastic resin, such as plastic. The insert 40 can also be placed into the aperture formed in the ring 14 after the ring 14 is fabricated.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A utility box, comprising:
    a housing, and
    a ring affixed on an upper circumferential rim of the housing, the ring adapted to receive a cover, the ring forming a through hole extending straight through from an upper surface of the ring to a lower surface of the ring, the through hole having,
        a bore having a first diameter at an upper portion of the through hole near the upper surface of the ring, the bore adapted to receive an attachment means depending from the cover,
        tabs at a lower portion of the through hole near the lower surface of the ring, the tabs partially forming a retaining recess having a second diameter disposed between the tabs and the bore, the tabs extending partially into the second diameter and forming a third diameter, the tabs adapted to receive a fastener there through, where the fastener has a fourth diameter, the retaining recess adapted to receive a flexible washer having a fifth diameter that deforms to pass through the tabs to return to its fifth diameter within the retaining recess, where the tabs are adapted to retain the flexible washer within the retaining recess against a first downward force, and to allow the flexible washer to be ejected from the retaining recess through the tabs upon application of a second downward force that is greater than the first downward force, and
        a fastener cavity disposed within the through hole between the bore and the retaining recess, the fastener cavity having a sixth diameter, the fastener cavity adapted to receive the fastener, which mates with and secures the attachment means depending from the cover, where the fastener is retained within the fastener cavity when the flexible washer is disposed within the retaining recess, and the fastener is loosed from the fastener cavity when the flexible washer is removed from the retaining recess, the fastener cavity adapted to prohibit complete rotation of the fastener around an axis that is substantially parallel to the through hole when the fastener is disposed within the fastener cavity,
    where,
        the fourth diameter is greater than the first diameter,
        the sixth diameter is greater than the fourth diameter,
        the fifth diameter is greater than the fourth diameter,
        the second diameter is greater than the fifth diameter, and
        the third diameter is less than the fifth diameter.

2. The utility box of claim 1, wherein the ring is molded onto the housing.

3. The utility box of claim 1, wherein the housing is open at an end disposed opposite from the ring.

4. The utility box of claim 1, further comprising a cover having a bore adapted to receive and retain the attachment means to the cover when the attachment means are drawn in a downward direction toward the ring, and for presenting the attachment means into the through hole in the ring.

5. The utility box of claim 1, wherein the ring is cast onto the housing and is formed of polymer concrete.

6. The utility box of claim 1, wherein the housing is formed of fiberglass.

7. The utility box of claim 1, wherein the ring includes at least two of the through holes.

8. The utility box of claim 1, wherein the attachment means comprises a bolt.

9. The utility box of claim 1, wherein the fastener comprises a nut.

10. The utility box of claim 1, wherein the fastener cavity substantially prohibits any rotation of the fastener when the fastener is disposed within the fastener cavity.

11. A utility box, comprising:
    a housing, and
    a ring affixed on an upper circumferential rim of the housing, the ring adapted to receive a cover, the ring forming a through hole from an upper surface of the ring, the through hole having,
- a bore having a first width at an upper portion of the through hole near the upper surface of the ring, the bore adapted to receive an attachment means depending from the cover,
- a fastener cavity disposed within the through hole below the bore, the fastener cavity having a second width that is greater than the first width, the fastener cavity adapted to receive a fastener, which mates with and secures an attachment means depending from the cover, the fastener cavity adapted to prohibit complete rotation of the fastener around an axis that is substantially parallel to the through hole when the fastener is disposed within the fastener cavity, the fastener cavity open to an inside of the housing and ring through a side of the fastener cavity, and
- a retaining recess disposed below the fastener cavity, the retaining recess adapted to receive a washer, where the washer is positioned to hold the fastener on a bottom of the fastener cavity, the retaining recess open to the inside of the housing and ring through a side of the fastener cavity.

12. The utility box of claim 11, wherein the ring and housing are formed as a single molded piece of material.

13. The utility box of claim 11, further comprising a cover having a bore adapted to receive and retain the attachment means to the cover when the attachment means are drawn in a downward direction toward the ring, and for presenting the attachment means into the through hole in the ring.

14. The utility box of claim 11, wherein the ring includes at least two of the through holes.

15. A utility box, comprising:
- a housing,
- a ring affixed on an upper circumferential rim of the housing, the ring adapted to receive a cover, the ring forming an aperture extending straight through from an upper surface of the ring to a lower surface of the ring,
- an insert fit into the aperture of the ring and formed of a different material from that of the ring, the insert forming a through hole having,
  - a bore having a first diameter at an upper portion of the through hole, the bore adapted to receive an attachment means depending from the cover,
  - tabs at a lower portion of the through hole, the tabs partially forming a retaining recess having a second diameter disposed between the tabs and the bore, the tabs extending partially into the second diameter and forming a third diameter, the tabs adapted to receive a fastener there through, where the fastener has a fourth diameter, the retaining recess adapted to receive a flexible washer having a fifth diameter that deforms to pass through the tabs to return to its fifth diameter within the retaining recess, where the tabs are adapted to retain the flexible washer within the retaining recess against a first downward force, and to allow the flexible washer to be ejected from the retaining recess through the tabs upon application of a second downward force that is greater than the first downward force, and
  - a fastener cavity disposed within the through hole between the bore and the retaining recess, the fastener cavity having a sixth diameter, the fastener cavity adapted to receive the fastener, which mates with and secures the attachment means depending from the cover, where the fastener is retained within the fastener cavity when the flexible washer is disposed within the retaining recess, and the fastener is loosed from the fastener cavity when the flexible washer is removed from the retaining recess, the fastener cavity adapted to prohibit complete rotation of the fastener around an axis that is substantially parallel to the through hole when the fastener is disposed within the fastener cavity, where,
- the fourth diameter is greater than the first diameter,
- the sixth diameter is greater than the fourth diameter,
- the fifth diameter is greater than the fourth diameter,
- the second diameter is greater than the fifth diameter, and
- the third diameter is less than the fifth diameter.

16. The utility box of claim 15, further comprising a cover having a bore adapted to receive and retain the attachment means to the cover when the attachment means are drawn in a downward direction toward the ring, and for presenting the attachment means into the through hole in the ring.

17. The utility box of claim 15, wherein the ring is cast onto the housing and is formed of polymer concrete.

18. The utility box of claim 15, wherein the insert is formed of a thermoplastic resin.

19. The utility box of claim 15, wherein the ring includes at least two of the through holes.

20. The utility box of claim 15, wherein the fastener cavity substantially prohibits any rotation of the fastener when the fastener is disposed within the fastener cavity.

* * * * *